United States Patent Office 2,976,256
Patented Mar. 21, 1961

2,976,256

BITUMINOUS COMPOSITIONS CONTAINING EPOXY ETHER RESIN AND CHLORINATED RUBBER

Fred Whittier and Raymond J. Lawn, Pittsburgh, Pa., assignors, by mesne assignments, to Pittsburgh Chemical Company, Pittsburgh, Pa., a corporation of Pennsylvania No Drawing. Filed May 2, 1957, Ser. No. 656,487

8 Claims. (Cl. 260—3.3)

This invention relates to novel coating compositions and, more particularly, to cold or air setting corrosion-resistant bituminous compositions which are especially adapted for application to steel and concrete surfaces, although not limited to such uses.

Recently there have been developed compositions comprising coal tar pitch (which pitch is substantially insoluble in alkali, ethanol and propanol) and an epoxy ether resin, more especially a bis-phenol A-epichlorhydrin, which have proven outstanding for coating steel and concrete, as well as in other applications; note U.S. Patent No. 2,765,288.

It is an object of the present invention to prepare compositions containing coal tar pitch which have an improved under water bond.

An additional object is to improve the thixotropic properties of such compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The epoxy ethers or resins, suitable for use in the compositions of the invention, correspond with those described in U.S. Patents Nos. 2,528,417, of October 31, 1950, and 2,500,449, of March 14, 1950, i.e, they contain along with ethereal oxygen, glycidyl groups in such quantity that the material has a 1,2-epoxy equivalency in the average molecule, of greater than one. By the epoxy equivalency, reference is made to the average number of 1,2-epoxy groups

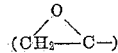

contained in the average molecule of the ether.

A preferred group of epoxy ethers for use in the invention is prepared by reacting a dihydric phenol with epichlorhydrin in alkaline solution. These products are of resinous character and are either solid or liquid materials at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bisphenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis-(2-dihydroxy-naphthyl)-methane, 1,5-dihydroxy naphthalene, etc. The product may be represented by the formula:

wherein n is an integer, preferably from 0 to 7, and R represents the divalent hydrocarbon radical of the dihydric phenol. The preferred epoxy ethers for use in the invention are those having epoxy values no less than 0.20 (pyridinium chloride method), and melting points no greater than 80° C. (Durran's mercury method). The preferred phenol is bis-phenol A.

Less preferably, there can be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erythritol, pentaglycerol, mannitol, sorbitol polyallyl alchol, polyvinyl alcohol, and the like.

In general, the glycidyl ether resin will contain at least one epoxy group and usually less than two per molecule. The epoxy equivalency may be defined as the number of grams of resin containing one gram equivalent of epoxide.

In addition to the coal tar pitch, epoxy ether resin and, if desired, filler and vehicle, the products of the invention should also include an agent for rapid setting or curing of the coating. For this purpose, there may be used small amounts of poly-functional amines, such as ethylene diamine, ethylene triamine, benzyl dimethylamine, 3-dimethylaminopropylamine, 3-diethylaminopropylamine, tetraethylene pentamine and the like.

Additional curing agents include N-hydroxyethyl diethylenetriamine, tri(dimethylaminomethyl)phenol, m-phenylenediamine, dicyandiamide, melamine, triethylene tetramine, piperazine, diacetone diamine, 4,4'-diaminodiphenyl sulfone, sodium hydroxide, potassium hydroxide, sodium phenoxide, acid materials preferably having a plurality of acid groups, e.g., oxalic acid, phthalic anhydride, citric acid, tricarbyllic acid, aconitic acid, itaconic acid, malic acid, diglycollic acid, phosphoric acid, n-butyl dihydrogen phosphate, diethyl ortho phosphate, hexaethyl tetraphosphate, Friedel-Crafts metal halides, e.g., aluminum chloride, zinc chloride, ferric chloride, boron trifluoride, boron-fluoride-diethyl ether complex, boron-fluoride-phenol complex, diisocyanates, e.g., 2,4-toluene diisocyanate, and polyamides, e.g., long chain fatty acid amides such as Versamid 115 and Versamid 125.

Amines and amides having at least 5 carbon atoms are often especially effective.

The curing agents may be used in various amounts, although they are usually employed in the range of from 0.05 to 0.25 part per part by weight of epoxy ether resin. The preferred epoxy resins may be set into a cured state simply by the addition thereto of the curing agent at ambient temperatures, e.g., 10 to 60° C., and, hence, these two ingredients are usually kept separated until just before application of the composition to the surface to be coated, e.g., the metal or concrete surface or pipe line joints. Accordingly, the products of the invention are normally made up in the form of a two-component system, one component containing the non-neutral catalyst or curing agent, and the other containing the epoxy resin.

The quantity of epoxy resin admixed with the coal tar pitch and, if desired, filler and vehicle can be widely varied. Thus, compositions of the invention may comprise 10 to 90 parts of epoxy resin and 90 to 10 parts of pitch based on 100 parts by weight of the total epoxy resin-pitch content. Normally, however, from 15 to 50 parts of epoxy ether resin and from 85 to 50 parts of pitch based on 100 parts of epoxy resin-pitch content are employed. When the epoxy resin content is very small, the curing time is unduly prolonged.

It has been found that the gel structures of the epoxy resin-pitch compositions are improved and that the underwater adhesion is also improved if there is included in the composition a minor amount of chlorinated rubber (Parlon) or rubber hydrochloride. Generally, the rubber hydrochloride or the chlorinated rubber is used in an amount of 0.1 to 5% of the total composition by weight and, more preferably, in an amount of 0.5 to 1% of the total composition. The chlorinated rubber is particularly effective when used in an amount of about 2% of the coal tar solution (the coal tar solution is the pitch or mixture of pitch and solvent when the latter is employed).

It has also been found advantageous to employ thixotropic agents in both compositions which do and do not contain rubber hydrochloride or chlorinated rubber. Among such agents may be mentioned Cabosil (a colloidal silica formed in a high temperature vapor phase flame hydrolysis process which produces an extremely fine product with a particle diameter of about 15 millimicrons; chemically it is practically a pure silica with an average $SiO_2$ content of 99 to 99.7% quaternary ammonium clays, such as Bentone 34 (dimethyl dioctadecyl ammonium bentonite) and Bentone 38. The quaternary ammonium clays have the advantage over Cabosil of producing smoother mixes which are easier to mill. Also, there can be used products of esterification of active silanol groups on amorphous silica with an alcohol. The average particle size is 8 to 10 millimicrons. Fuller's earth or Attapulgus type clays with cationic surfactants can also be used.

The thixotropic agent, when employed, is preferably present in an amount of 1.0% to 5.0% of the total composition.

Fillers can be employed as reinforcing agents, e.g., mineral fillers such as talc, mica, finely divided soapstone, slate flour, kaolin, aluminum silicate pigments and diatomaceous earth.

There can also be employed solvents and/or diluents which are mutually miscible with the coal tar and/or epoxy resins, e.g., aromatic hydrocarbon liquids such as high flash naphtha, xylene and toluene, creosote oil, ketones, chlorinated solvents, etc. which may be incorporated in the compositions of the invention in amounts sufficient to reduce the viscosity of the composition to a workable consistency. As will be appreciated, the aromatic hydrocarbon liquids or other solvent may be excluded if a workable viscosity is obtained without the same. Coal tar itself can be employed as the source of coal tar pitch.

Unless otherwise stated, all parts and percentages are by weight.

*Example 1*

COMPONENT A

| | Parts |
|---|---|
| Epoxy ether resin from bis-phenol A and epichlorhydrin (melting point 9° C. and epoxy value 0.50) | 30 |
| Parlon (chlorinated rubber) | 0.6 |
| Coal tar pitch | 29.4 |
| Aromatic high flash naphtha | 20.0 |
| Mica | 9.0 |
| Talc | 10.0 |
| Cabosil (flame hydrated silica) | 1.0 |

COMPONENT B

| | |
|---|---|
| Tri(dimethylaminomethyl) phenol | 6.5 |

Components (a) and (b) were mixed together and brushed directly onto a steel pipe line joint at 20 to 30° C. The mixture became set into a tough, corrosion-resistaint, rubbery film within 24 hours. The cured product had outstanding adhesion when the pipe line joint was tested underwater for an extended period of time.

*Example 2*

Example 1 was repeated replacing the epoxy ether resin by the same amount of Jones and Dabney Resin 504 (an epoxy ether resin made from bis-(4-hydroxyphenyl)-2,2-propane and epichlorhydrin and having a viscosity of 120 centipoises and replacing the tri(dimethylaminomethyl) phenol by an equal weight of diethylenetriamine. The results were substantially the same as in Example 1.

*Example 3*

Example 1 was repeated but the coal tar pitch and the naphtha were replaced by 49.4 parts of dehydrated coal tar with similar results.

*Example 4*

Example 1 was repeated but there was used 5 parts of Parlon in place of 0.6 part.

*Example 5*

Example 1 was repeated but there was used only 0.1 part of Parlon.

*Example 6*

COMPONENT A

| | Parts |
|---|---|
| Epoxy ether resin of Example 2 | 30.2 |
| Parlon | 0.6 |
| Coal tar pitch | 29.4 |
| Mica | 9.0 |
| Talc | 10.0 |
| Cabosil | 1.0 |

COMPONENT B

| | |
|---|---|
| Piperazine | 7.0 |

Components (a) and (b) were mixed together and applied as in Example 1. The cured films were more flexible than those produced in Example 1.

*Example 7*

To show the advantage of utilizing a thixotropic agent, the following compositions were prepared:

| | A | B | C | D |
|---|---|---|---|---|
| | Percent | Percent | Percent | Percent |
| Coal tar pitch | 27 | 27 | 26.25 | 26.25 |
| Parlon | 0 | 0 | 0.75 | 0.75 |
| Hi flash naphtha | 22 | 22 | 22 | 22 |
| Pulverized talc | 10 | 10 | 10 | 10 |
| Pulverized mica | 10 | 9 | 10 | 9 |
| Epoxy resin of Example 1 | 31 | 31 | 31 | 31 |
| Cabosil | 0 | 1 | 0 | 1 |

Mixes A and C when applied in a wet film 20 mils thick sagged and ran from a vertical surface, while mixes B and D containing the Cabosil held in place with no evidence of running. All the mixes A, B, C and D, cured to tough, corrosion-resistant, rubbery films upon admixtures of 7 parts of phenylene diamine with 100 parts of the mix and brushing of the resulting mixtures onto steel pipe joints. Compositions C and D had exceptionally good underwater adhesion.

N-hydroxyethyl diethylenetriamine can be used to replace the amines in any of the examples and has the advantage of low toxicity as compared to most organic amines.

Diethyl amine propyl amine is relatively slow in curing action, taking four times as long as diethylenetriamine in setting up time. This is of advantage when a longer pot life is desired or when it is desired to facilitate solvent release from the film before a complete cure of the resin has been effected.

Piperazine, phenylene diamine and polyamides, such as

Versamid 115 and Versamid 125, have the advantage of increasing the flexibility of the cured films.

Other ingredients can also be added to the compositions of the present invention, e.g., melamine-formaldehyde resins, urea-formaldehyde resins, phenol-formaldehyde resins, cresol-formaldehyde resins, vinyl chloride resins, vinylidene chloride resins, furfuryl alcohol resins, polyvinyl acetals, e.g., polyvinyl butyral, toluene sulfonamide-formaldehyde resins, etc., as well as fillers and solvents, as previously mentioned. Thus, there can be employed a composition similar to composition 7B but including 0.1 to 5 parts, e.g., 0.75 part of vinyl chloride in addition to the 100 parts of composition mixed with the amine curing agent. A like amount of a vinylidene chloride resin can alternatively be employed.

The compositions of the present invention have numerous uses. In addition to coating steel and concrete, they can be employed to coat glass containers, neon tubes, fluorescent tubes, steel pipes, concrete pipes, aluminum tubes; they can be used to bond abrasive grains to each other or to bond sandpaper to abrasive grains or as binders for abrasive wheels; they can be employed as binders for asphalt or concrete pavements of all kinds, e.g., roads, airport runways, sidewalks, non-skid pavements, floor tiles, stair treads, etc.; they can be used to bond glass to metal or metal to metal. Likewise, they can be used to directly coat electrical wires, e.g., copper wire, or to coat an insulating material such as rubber, paper, textile fabric, synthetic resin or the like which has previously been applied to the wire. They can also be employed to line the inside or outside of steel, aluminum or other metal, concrete or synthetic resin tanks. Similarly, they can be employed as protective coatings for valve fittings and, in general, wherever pitch and/or epoxy resins have been employed in the past. In addition, they are useful in bonding paper plies, wood plies and other lamina, forming water-proof coatings on paper, wood, water sensitive synthetic resins, as caulking compounds, e.g., in ship caulking. With toxic agents such as copper, copper and arsenic salts, DDT, pentachlor phenol, etc. mixed into the above compositions, coatings of good anti-fouling properties are produced. They can be used with cork or asbestos in insulating; they can also be employed as weather coating, e.g., as a coating for magnesium employed as insulation for steam lines. Furthermore, they may be employed in potting compounds, with sand as a mastic coating, as core compounds, as electrode or briquette binders, etc.

We claim:

1. A bituminous composition comprising coal tar pitch, an epoxy ether resin having a 1,2-epoxy equivalency of greater than one, 0.1–5% based on the weight of the total composition of a member of the group consisting of chlorinated rubber and rubber hydrochloride and 1–5% based on the weight of the total composition of a thixotropic agent selected from the group consisting of colloidal silica, quaternary ammonium clays and alcohol esterified amorphous silica, wherein said epoxy ether resin is between 10 and 90% of the mixture of epoxy ether resin and said coal tar pitch.

2. A bituminous composition comprising coal tar pitch, a glycidyl polyether of a dihydric phenol having a 1,2-epoxy equivalency of greater than one, 0.1–5% based on the weight of the total composition of a member of the group consisting of rubber hydrochloride and chlorinated rubber and 1–5% based on the weight of the total composition of a thixotropic agent selected from the group consisting of colloidal silica, quaternary ammonium clays and alcohol esterified amorphous silica, wherein said epoxy ether resin is between 10 and 90% of the mixture of epoxy ether resin and said coal tar pitch.

3. A bituminous composition comprising 10 to 90% of coal tar pitch and conversely 90 to 10% of a glycidyl polyether of bis-(4-hydroxyphenyl)-2,2-propane having a 1,2-epoxy equivalency of greater than one, said percentages being based on the total of said pitch and said glycidyl polyether, and also including 0.1–5% based on the total composition of a member of the group consisting of rubber hydrochloride and chlorinated rubber and 1.0–5% of a thixotropic agent selected from the group consisting of colloidal silica, quaternary ammonium clays and alcohol esterified amorphous silica based on the total composition.

4. A composition of claim 3 including a curing agent for said glycidyl polyether.

5. A composition of claim 3 including a liquid organic solvent.

6. A composition of claim 5 wherein said solvent comprises the liquid constituents of coal tar.

7. A bituminous composition of claim 3 wherein said member is chlorinated rubber.

8. A bituminous composition comprising coal tar pitch, an epoxy ether resin having a 1,2-epoxy equivalency of greater than one, 0.1–5% based on the weight of the total composition of a member of the group consisting of chlorinated rubber and rubber hydrochloride and a curing agent selected from the group consisting of amines and amides having at least five carbon atoms, wherein said epoxy ether resin is between 10 and 90% of the mixture of epoxy ether resin and said coal tar pitch.

References Cited in the file of this patent

UNITED STATES PATENTS

| | | |
|---|---|---|
| 2,384,132 | Raynolds | Sept. 4, 1945 |
| 2,631,137 | Loritsch et al. | Mar. 10, 1953 |
| 2,765,288 | Whittier et al. | Oct. 2, 1956 |
| 2,773,043 | Zukas | Dec. 4, 1956 |